US012750393B2

(12) United States Patent
White

(10) Patent No.: US 12,750,393 B2
(45) Date of Patent: Sep. 29, 2026

(54) PREDICTIVE MODEL OF VULNERABILITIES FOR DIGITAL INFRASTRUCTURE ASSETS

(71) Applicant: Truist Bank, Charlotte, NC (US)

(72) Inventor: Brian Matthew White, Mint Hill, NC (US)

(73) Assignee: TRUIST BANK, Charlotte, NC (US)

( * ) Notice: Subject to any disclaimer, the term of this patent is extended or adjusted under 35 U.S.C. 154(b) by 47 days.

(21) Appl. No.: 18/897,716

(22) Filed: Sep. 26, 2024

(65) Prior Publication Data

US 2026/0089183 A1 Mar. 26, 2026

(51) Int. Cl.
*H04L 9/40* (2022.01)

(52) U.S. Cl.
CPC ...... *H04L 63/1433* (2013.01); *H04L 63/1425* (2013.01); *H04L 63/205* (2013.01)

(58) Field of Classification Search
None
See application file for complete search history.

(56) References Cited

U.S. PATENT DOCUMENTS 9,544,327 B1 * 1/2017 Sharma .................. G06N 20/00
12,229,548 B1 * 2/2025 Patterson .............. G06F 18/214
2019/0102564 A1 * 4/2019 Li ........................... G06F 21/57
2021/0211452 A1 * 7/2021 Patel ................... H04L 63/1416
2023/0033317 A1 * 2/2023 Lin ...................... H04L 63/1433

* cited by examiner

*Primary Examiner* — Taghi T Arani
*Assistant Examiner* — Joshua Raymond White
(74) *Attorney, Agent, or Firm* — Michael A. Springs, Esq.; Shumaker, Loop & Kendrick, LLP; Patrick B. Horne

(57) ABSTRACT

Systems and methods are disclosed that utilize a predictive model of vulnerabilities for digital infrastructure assets. The system comprises a computing system with at least one processing device and at least one memory device, wherein the computing system executes computer-readable instructions. A network connection operatively connects the devices of the computing system. Upon execution of the computer-readable instructions, the computing system is configured to receive vulnerability data for one or more digital infrastructure assets; generate a vulnerability data set based on the vulnerability data for the one or more digital infrastructure assets; generate a predictive model based on the vulnerability data set; determine at least one security measure for the one of more digital infrastructure assets based on the predictive model; and implement the at least one security measure for the one or more digital infrastructure assets based on the predictive model.

12 Claims, 7 Drawing Sheets

PREDICTIVE MODEL OF VULNERABILITIES FOR DIGITAL INFRASTRUCTURE ASSETS

FIELD

This invention relates generally to the field of cybersecurity, and more particularly embodiments of the invention relate to systems and methods to improve system security and network data flow by using a predictive model of vulnerabilities for digital infrastructure assets.

BACKGROUND

Enterprises such as financial institutions and various other types of commercial businesses provide information and features to users through sophisticated client-side applications that shape the enterprise landscape, influence user sentiment and behavior, and communicate information to the user. The client-side applications are in communication with one or more servers developed by the enterprise. Server development also involves creating and maintaining server-side applications and infrastructure. In the evolving landscape of enterprises, securing the servers and server-side applications has become a pivotal concern. These servers and applications are prime targets for cyberattacks due to their critical role in managing financial and personal data. As a result, enterprises must implement robust methods to address server and server-side application security risks and ensure the safety of user data.

Key areas of server development include architecture, database management, and security. Server-side applications can utilize various frameworks and programming languages (e.g., PHP, Ruby, Node.js, Python, Java) to provide access and functionality to the server operating system. Database management is also important to server development by ensuring efficient data storage and retrieval. Most important, however, is security. It is essential to implement security measures to protect against threats. Poorly configured servers and server-side applications can expose sensitive data. Inadequate protection of data in transit or at rest can lead to data breaches.

As the threat landscape continues to evolve, it is essential for enterprises to remain proactive and adaptive, continually enhancing security measures to safeguard against emerging risks and ensure the safety of user data. By prioritizing security throughout the development process, the risk of vulnerabilities in the server and server-side applications can be reduced.

Accordingly, it would be desirable to develop a system and method that improves system security and network data flow by using a predictive model for predicting vulnerabilities of digital infrastructure assets.

SUMMARY

In concordance and agreement with the presently described subject matter, a system and method that improves system security and network data flow by using a predictive model for predicting vulnerabilities of digital infrastructure assets, have been newly designed. Shortcomings of the prior art are overcome and additional advantages are provided through the systems and the methods in accordance with the present disclosure.

An object of the invention is to predict vulnerabilities for the digital infrastructure assets to determine a likelihood of improving security of the enterprise system by decreasing security vulnerabilities, in number and/or severity. The enterprise system may use the predicted vulnerabilities to manage, prioritize, and/or modify the digital infrastructure assets as well the developer agent(s) involved with a development thereof.

In one embodiment, a method of improving system security, comprises: providing a computing system with at least one processing device and at least one memory device, wherein the computing system executes computer-readable instructions; providing a network connection operatively connecting the devices of the computing system, the network connection configured to permit network data flow between the devices of the computing system; receiving, via the computing system, vulnerability data for one or more digital infrastructure assets; generating, via the computing system, the vulnerability data set based upon the vulnerability data for the one or more digital infrastructure assets; generating, via the computing system, a predictive model based on the vulnerability data set; determining, via the computing system, at least one security measure for the one of more digital infrastructure assets based on the predictive model; and implementing, via the computing system, the at least one security measure for the one or more digital infrastructure assets based on the predictive model.

In another embodiment, a system for improving system security, comprises: a computing system with at least one processing device and at least one memory device, wherein the computing system executes computer-readable instructions; and a network connection operatively connecting the devices of the computing system, the network connection configured to permit network data flow between the devices of the computing system; wherein, upon execution of the computer-readable instructions, the computing system is configured to: receive, via the computing system, vulnerability data for one or more digital infrastructure assets; generate, via the computing system, the vulnerability data set based upon the vulnerability data for the one or more digital infrastructure assets; generate, via the computing system, a predictive model based on the vulnerability data set; determine, via the computing system, at least one security measure for the one of more digital infrastructure assets based on the predictive model; and implement, via the computing system, the at least one security measure for the one or more digital infrastructure assets based on the predictive model.

As aspects of some embodiments, the vulnerability data set includes historical vulnerability data for the one or more digital infrastructure assets.

As aspects of some embodiments, the one or more digital infrastructure assets comprises one or more servers.

As aspects of some embodiments, the vulnerability data includes a programming language of the one or more servers.

As aspects of some embodiments, the vulnerability data includes human element vulnerabilities related to an experience level of each of one or more developers of the one or more digital infrastructure assets.

As aspects of some embodiments, the vulnerability data includes human element vulnerabilities related to an aggregate experience level of one or more developers of the one or more digital infrastructure assets.

As aspects of some embodiments, the vulnerability data includes human element vulnerabilities related to a team of developers of the one or more digital infrastructure assets.

As aspects of some embodiments, the at least one security measure is training for one or more of the developers of the one or more digital infrastructure assets.

As aspects of some embodiments, the method further comprises prioritizing an implementation of the at least one security measure based on the predictive model.

As aspects of some embodiments, the method further comprises: initiating, via the computing system, a machine learning program as the predictive model; applying, via the computing system, the vulnerability data set to the predictive model; and predicting, via the computing system, the vulnerabilities of the one or more digital infrastructure assets based upon the vulnerability data set.

As aspects of some embodiments, upon execution of the computer-readable instructions, the computing system is further configured to prioritize, via the computing system, an implementation of the at least one security measure based on the predictive model.

As aspects of some embodiment, upon execution of the computer-readable instructions, the computing system is further configured to: initiate a machine learning program as the predictive model; apply the vulnerability data set to the predictive model; and predict vulnerabilities of the digital infrastructure assets based upon the vulnerability data set.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
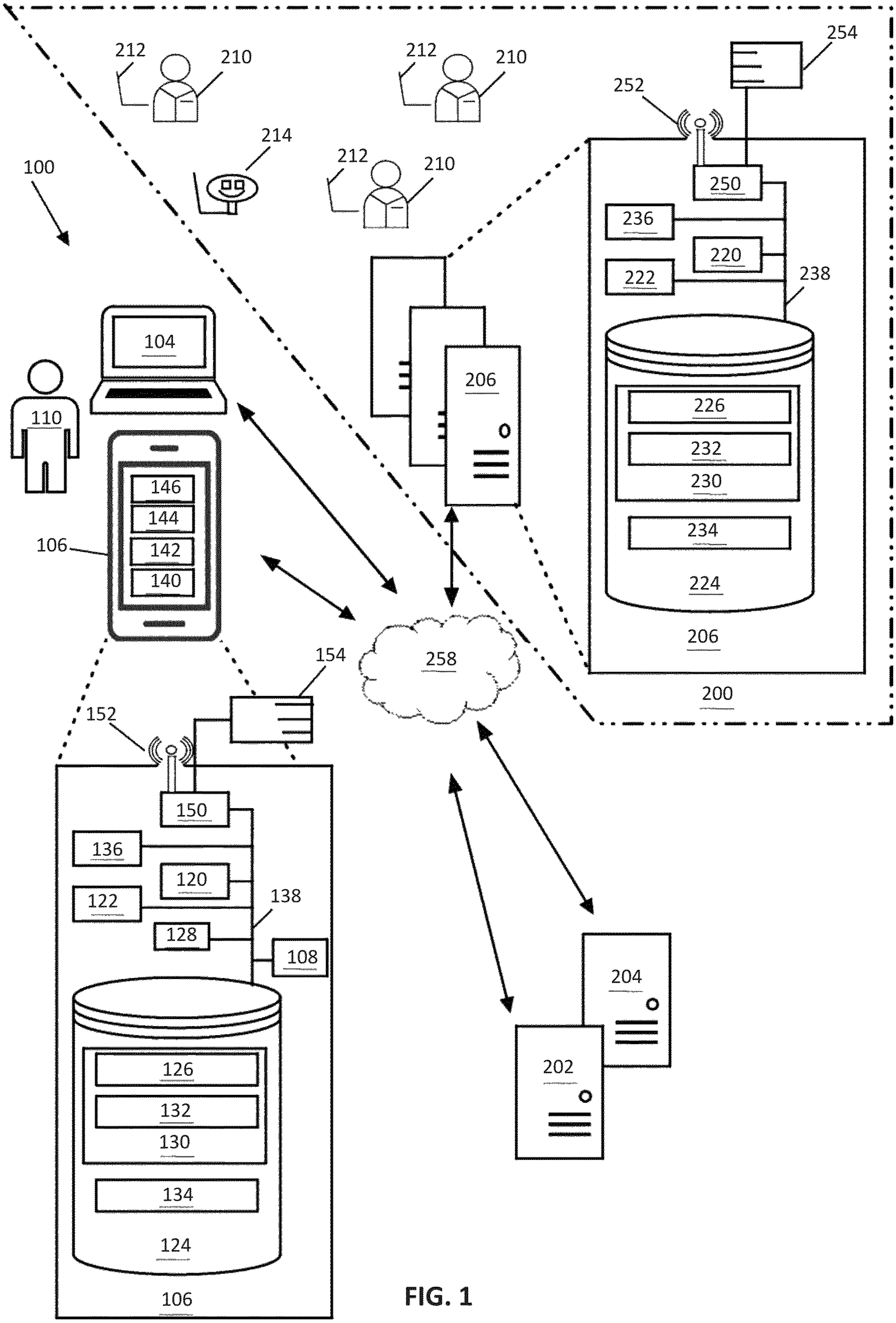
FIG. 1 is a schematic diagram illustrating an enterprise system and environment thereof for implementing a system and method of improving system security using a machine learning program for predicting vulnerabilities for a digital infrastructure asset in accordance with an embodiment of the presently described subject matter.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Like numbers refer to like elements throughout. Unless defined otherwise, technical and scientific terms used herein have the same meaning as commonly understood to one of ordinary skill in the art to which the presently disclosed subject matter pertains.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

The specification may include references to "one embodiment," "an embodiment," "various embodiments," "one or more embodiments," etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Furthermore, a device or structure that is configured in a certain way is configured in at least that way, but may also be configured in ways that are not listed.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method, step of a method, device or element of a device that "comprises," "has," "includes," or "contains," or uses similar language to describe one or more steps or elements possesses those one or more steps or elements, but is not limited to possessing only those one or more steps or elements.

The terms "couple," "coupled," "connected," and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about," "approximately," or "substantially" for any numerical values or ranges indicate a suitable dimensional tolerance that allows the device, part, or collection of components to function for its intended purpose as described herein.

As used herein, the terms "enterprise" or "provider" generally describes a person or business enterprise (e.g., company, organization, institution, business, university, etc.) that hosts, maintains, or uses computer systems that provide functionality for the disclosed systems and methods. The term "enterprise" may generally describe a person or business enterprise providing goods and/or services. Interactions between an enterprise system and a user device can be implemented as an interaction between a computing system of the enterprise and a user device of a user. For instance, user(s) may provide various inputs that can be interpreted and analyzed using processing systems of the user device and/or processing systems of the enterprise system. Further the enterprise computing system and the user device may be in communication via a network. According to various embodiments, the enterprise system and/or user device(s) may also be in communication with an external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein with reference to flowchart illustrations and/or block diagrams of computer-implemented method(s) and computing system(s). Each block or combinations of blocks of the flowchart illustrations and/or block diagrams can be implemented by computer readable program instructions or code that may be provided to a processor of a general purpose computer, special purpose computer, programmable data processing apparatus or apparatuses (the term "apparatus" includes systems and computer program products), and/or other device(s). In particular, the computer readable program instructions, which can be executed via the processor of the computer, programmable data processing apparatus, and/or other device(s), create a means for implementing the functions/acts specified in the flowchart and/or block diagram block(s).

In one embodiment, computer readable program instructions may also be stored in one or more computer-readable storage media that can direct a computer, programmable data processing apparatus, and/or other device(s) to function in a particular manner such that a computer readable storage medium of the one or more computer-readable storage media having instructions stored therein comprises an article of manufacture that includes the computer readable program instructions, which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block(s). Additionally or alternatively, these computer program instructions may be stored in a computer-readable memory that can direct a computer, programmable data processing apparatus, and/or other device(s) to function in a particular manner such that the instructions stored in the computer readable memory produce an article of manufacture that includes the computer readable program instructions, which implement the function/act specified in the flowchart and/or block diagram block(s). In some embodiments, computer-implemented steps/acts may be performed in combination with operator/human implemented steps/acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable computer readable program instructions for implementing the specified logical function(s). Similarly, alternative implementations and processes may also incorporate various blocks of the flowcharts and block diagrams.

For instance, in some implementations the functions noted in the blocks may occur out of the order noted in the figures. For example, two blocks shown in succession may be executed substantially concurrently, and/or the functions of the blocks may sometimes be executed in the reverse order, depending upon the functionality involved.

FIG. 1 illustrates a computing environment 100 that includes a computer system to provide access to a user device system, according to at least one embodiment of the present invention. The computing environment 100 generally includes a user 110 (e.g., customer of the enterprise) that benefits through use of services and products offered by an enterprise system 200. Use of the words "service(s)" or "product(s)" as used herein can be interchangeable. The user 110 can be an individual, a group, or any entity in possession of or having access to the user device 104, 106, which may be personal, enterprise, or public items. Although the user 110 may be singly represented in some figures, in at least in some embodiments the user 110 is one of many such that a market or community of users, consumers, customers, business entities, government entities, clubs, and groups of any size.

The computing environment 100 may include, for example, a distributed cloud computing environment (e.g., a private cloud, public cloud, community cloud, and/or hybrid cloud), an on-premise environment, fog-computing environment, and/or an edge-computing environment. The user 110 accesses services and/or products of the enterprise system 200 by use of one or more user devices, illustrated in separate examples as user devices 104, 106. Example user devices 104, 106 may include a laptop, desktop computer, tablet, a mobile computing device such as a smart phone, a portable digital assistant (PDA), a pager, a mobile television, a gaming device, an audio/video player, a virtual assistant device or other smart home device, a wireless personal response device, or any combination of the aforementioned, or other portable device with processing and communication capabilities.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device 104, 106 may be and/or include a workstation, a server, a set of servers, a cloud-based application or system, or any other suitable system or device adapted to execute any suitable operating system used on personal computers, central computing systems, phones, and/or other devices.

The user device 104, 106, but as illustrated with specific reference to the mobile device 106, includes at least one of each of a processing device 120, and a memory device 122 for processing use, such as random access memory (RAM), and read-only memory (ROM), and other various components. The illustrated mobile device 106 further includes a storage device 124 including at least one of a non-transitory storage medium, such as a microdrive, for long-term, intermediate-term, and short-term storage of computer-readable program instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and/or other data items preferred by the user or otherwise required or related to any or all of the applications or programs 130.

The memory device 122 is operatively coupled to the processing device 120. As used herein, memory device 122 includes store any computer readable medium configured to store data, code, and/or other information. The memory device 122 may include volatile memory, such as volatile Random Access Memory (RAM), and/or a cache area for the temporary storage of data. The memory device 122 may also include non-volatile memory and may be embedded and/or may be removable. The non-volatile memory additionally or alternatively can include an electrically erasable programmable read-only memory (EEPROM), flash memory, or the like.

According to various embodiments, the memory device 122 and storage device 124 may be combined into a single storage medium. The memory device 122 and storage device 124 can store any of a number of applications or programs 130 that comprise computer-executable program instructions or code executed by the processing device 120 to implement, via the user device 104, 106, the functions described herein. For example, the memory device 122 may store applications 132 and/or association data related to a conventional web browser application and/or an enterprise-distributed application (e.g., a mobile application). These applications 132 also typically provide a graphical user interface (GUI) that is displayed via the display 140 that allows the user 110 to perform functions via the application including to communicate, via the user device 104, 106 with the enterprise system 200, and/or other devices or systems. The GUI on the display 140 may include features for displaying information and accepting inputs from users, and may include input controls such as fillable text boxes, data fields, hyperlinks, pull down menus, check boxes, radio buttons, and the like.

In various embodiments, the user 110 may download, sign into, or otherwise access the application 132 from an enterprise system 200 or from a distinct application server. In other embodiments, the user 110 interacts with the enterprise system 200 via a web browser application 132 in addition to, or instead of, the downloadable version of the application 132.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 may also include the functionality to encode and interleave messages and data prior to modulation and transmission. The processing device 120 can additionally include an internal data modem to convert data from digital format to a format suitable for analog transmission. Further, the processing device 120 may include functionality to operate one or more software programs, which may be stored in the memory device 122 or in the storage device 124. For example, the processing device 120 may be capable of operating a connectivity program such as a web browser application 132. The web browser application 132 may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information and data that are used by the user device 104, 106 as well as the applications and devices that facilitate functions of the user device 104, 106, or that are in communication with the user device 104, 106, to implement the functions described herein, and other functions not expressly described. For example, the storage device 124 may include user authentication information data as well as other data.

The processing device 120, in various examples, can operatively perform calculations, can process instructions for execution, and can manipulate information. The processing device 120 can execute machine-executable program instructions stored in the storage device 124 and/or memory device 122 to perform the methods and functions as described or implied herein. Specifically, the processing device 120 can execute machine-executable instructions to perform actions as expressly provided in one or more corresponding flow charts and/or block diagrams or as would be impliedly understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to and processed by the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and the enterprise system 200.

In some embodiments, a credentialed system enabling authentication of a user may be necessary in order to provide access to the enterprise system 200. In one embodiment, the input and output system 136 may be configured to obtain and process various forms of authentication to authenticate a user 110 prior to providing access to the enterprise system 200. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning System (GPS) transceiver configured to be used by a positioning system to determine a location of the computing device 104 or mobile device 106. In some embodiments, the positioning system device 108 includes an antenna, transmitter, and receiver. In one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., system bus), electrically connects the various described, illustrated, and implied components of the mobile device 106. The intraconnect 138, in various non-limiting examples, can include or represent, a system bus, a high-speed interface connecting the processing device 120 to the memory device 122, providing electrical connections among the components of the mobile device 106, and may include electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide wired (e.g., via wired or docked communication by electrically conductive connector 154) or wireless (e.g., via wireless communication device 152) two-way communications and data exchange. Communications may be conducted via various modes or protocols, of which GSM voice calls, short message service (SMS), enterprise messaging service (EMS), multimedia messaging service (MMS) messaging, TDMA, CDMA, PDC, WCDMA, CDMA2000, and GPRS, are all non-limiting and non-exclusive examples. Wireless communications may be conducted via the wireless communication device 152, which can include, as non-limiting examples, a radio-frequency transceiver, a Bluetooth device, Wi-Fi device, a Near-field communication device, and other transceivers. In addition, GPS connections may be included for ingoing and/or outgoing navigation and location-related data exchanges. Wired communications may be conducted, e.g., via the connector 154, by USB, Ethernet, and/or other physically connected modes of data transfer.

The processing device 120 may, for example, be configured to use the communication interface 150 as a network interface to communicate with one or more other devices on a network. In this regard, the communication interface 150 utilizes the wireless communication device 152 such as an antenna operatively coupled to a transmitter and a receiver (or together a "transceiver") included with the communication interface 150. The processing device 120 is configured to provide signals to and receive signals from the transmitter and receiver, respectively. In various embodiments, the signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, and/or fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), with fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

The computing environment 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may be utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can offer any number or type of services and/or products to one or more users 110. In non-limiting examples, services and/or products may include retail services and products, information services and products, custom services and products, predefined or pre-offered services and products, consulting services and products, advising services and products, forecasting services and products, internet products and services, social media, data hosting, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of agents 210, can be employed, utilized, authorized or referred by the enterprise system 200. Such agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agents 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by the agent 210, a speaker serving as an output device, a camera serving as an input device, a buzzer, a bell, a printer and/or other user input devices and output devices for use by or communication with the agent 210 in accessing, using, and controlling, in whole or in part, the agent device 212.

Inputs by one or more agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side agent 210 and/or between multiple agents 210.

From a user perspective experience, an interaction in some examples within the scope of these descriptions begins with direct or first access to one or more agents 210 in person, by phone, or online for example via a chat session or website function or feature. In other examples, a user may be first assisted by a virtual agent 214 of the enterprise system 200, which may satisfy user requests or prompts by voice, text, or online functions, and may refer users to one or more agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications 132, 232 or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

The network 258 provides wireless or wired communications among the components of the system 100 and the environment thereof, including other devices local or remote to those illustrated, such as additional mobile devices, servers, and other devices communicatively coupled to the network 258, including those not illustrated in FIG. 1. The network 258 is singly depicted for illustrative convenience but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, systems, entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes. The enterprise system 200 may communicate with the external system 202, 204 using any combination of public or private communication.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
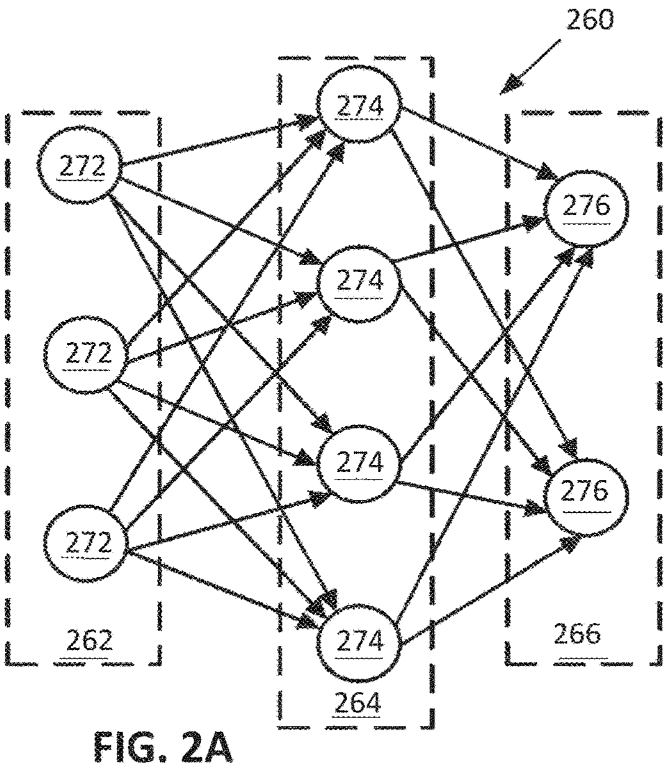
FIG. 2A is a diagram of a feedforward network, according to at least one embodiment, utilized in machine learning.
Figure 2C:
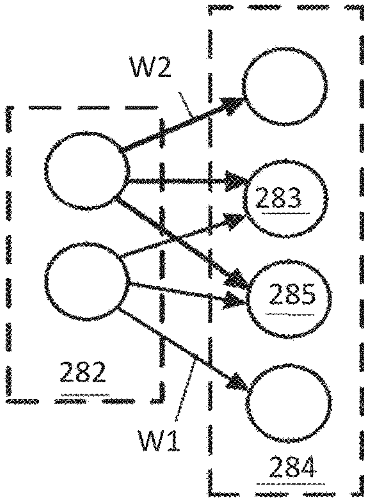
FIG. 2C is a diagram of a portion of the convolution neural network of FIG. 2B, according to at least one embodiment, illustrating assigned weights at connections or neurons.
Figure 2B:
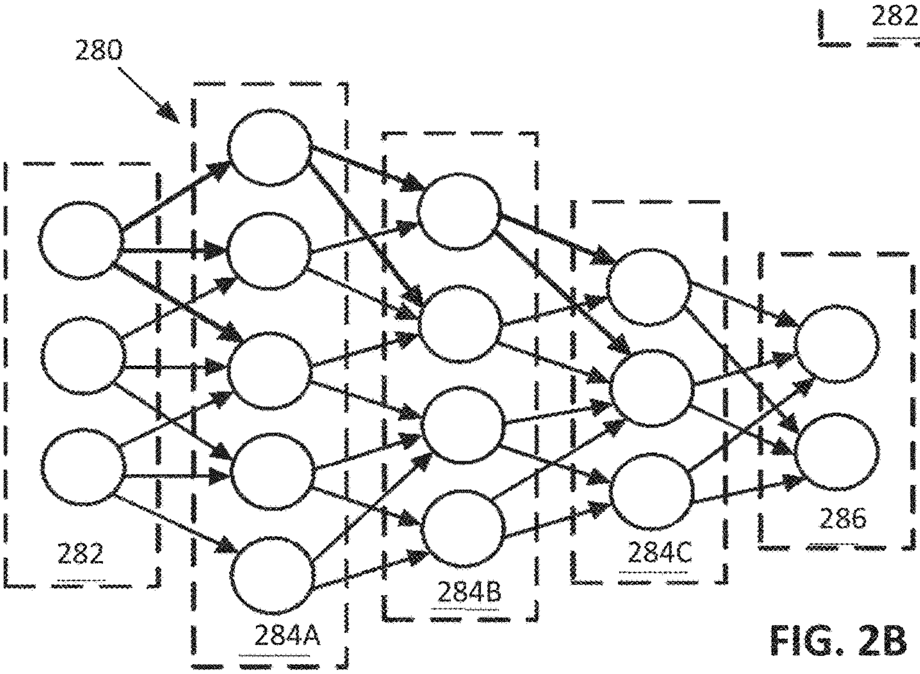
FIG. 2B is a diagram of a convolution neural network, according to at least one embodiment, utilized in machine learning.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
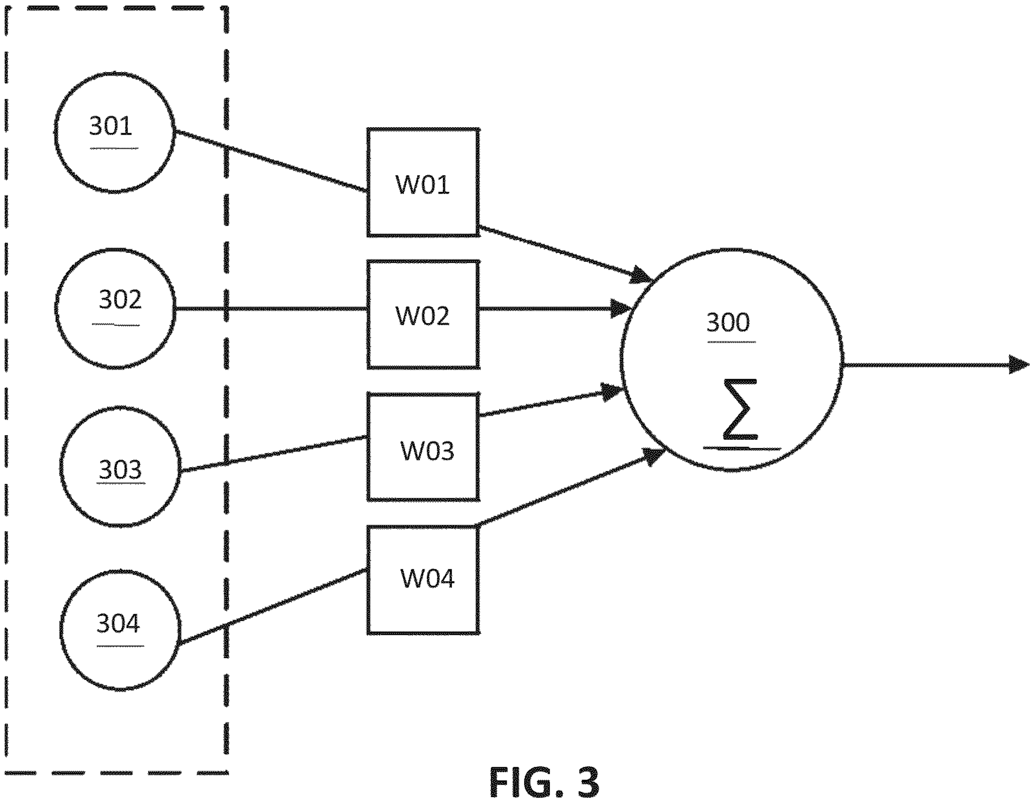
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
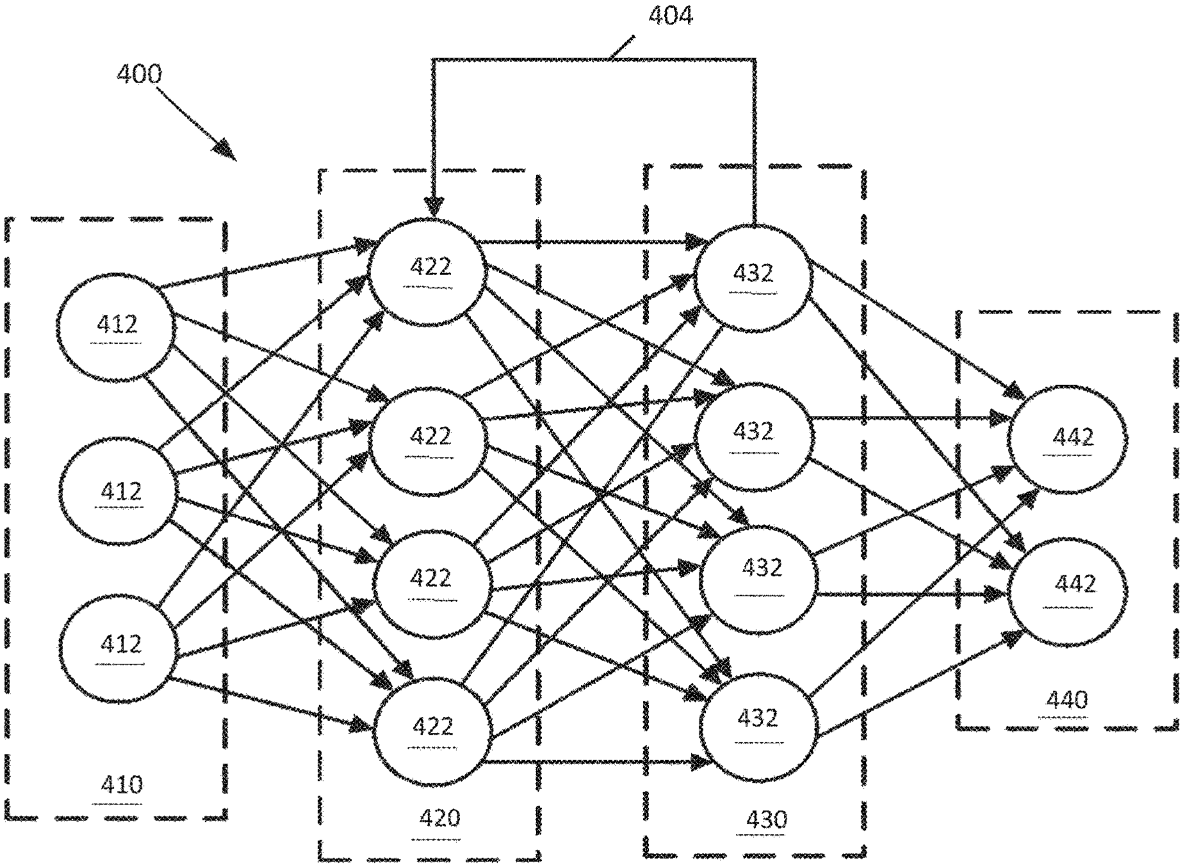
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
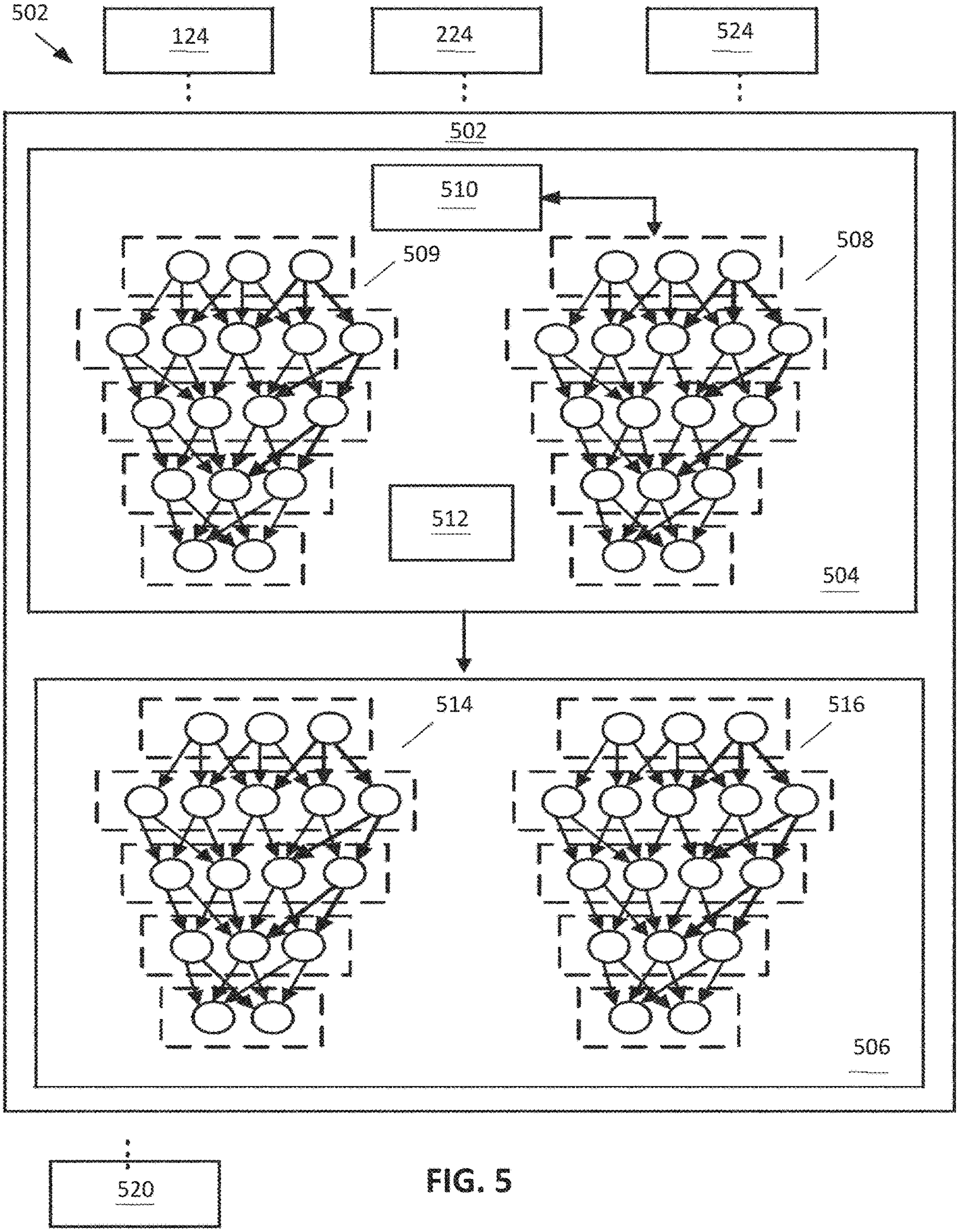
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processing device 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 124, and/or memory device 222) communicatively coupled to the AI processing device 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 6:
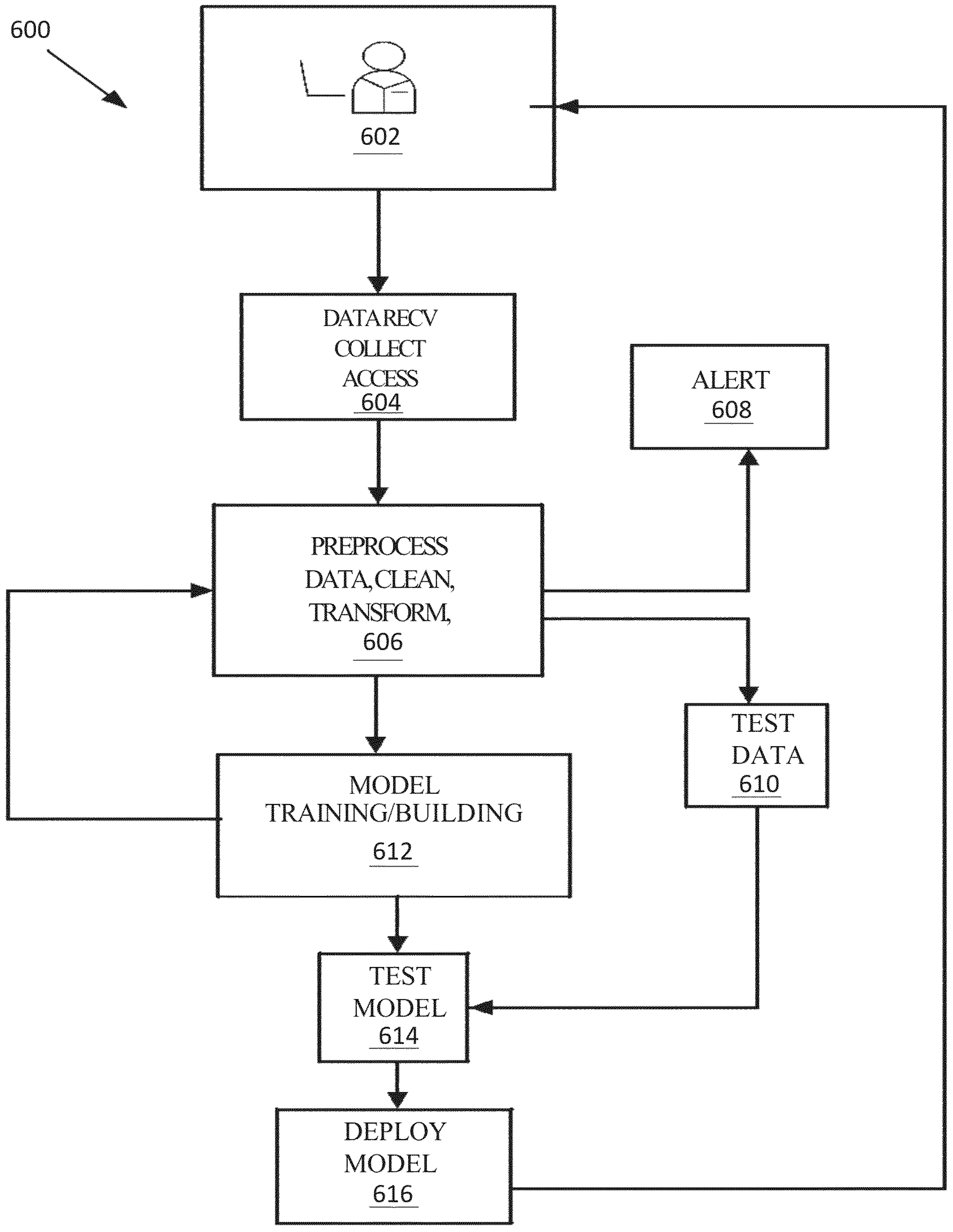
FIG. 6 is a flow diagram illustrating a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

The present invention relates to methods of operating the described enterprise system 200 for accessing vulnerabilities associated with digital infrastructure assets of the enterprise system 200, and more particularly the servers. The server may be a specialized computer or software system designed to provide services, data, or resources to other computing devices over the network 258. As used herein, the security measures generally refer to software and operating system updates vital for maintaining security and addressing security vulnerabilities as well as those that fix performance issues and provide enhanced security features. An aggregate of security measures to be implemented is referred to herein as a "service pack". Each of the security measures within the service pack may be rated by severity (e.g., critical, important, moderate, low, etc.).

Figure 7:
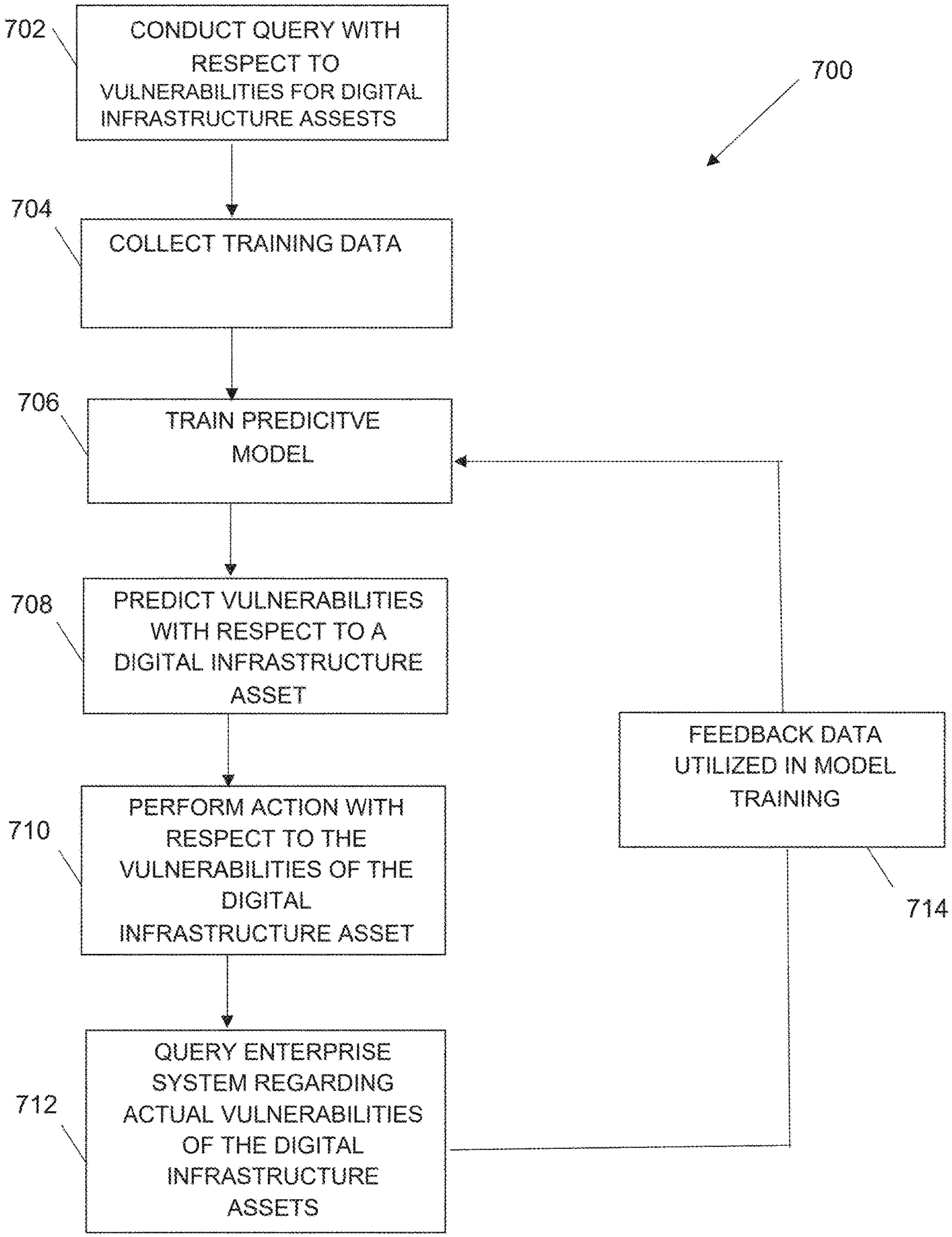
FIG. 7 is a flow diagram of an exemplary method of improving system security using a machine learning program for predicting vulnerabilities for a digital infrastructure asset according to the invention.

FIG. 7 illustrates an exemplary method 700 of implementing the machine learning program to improve system security and network data flow by predicting vulnerabilities for one or more digital infrastructure assets of the enterprise system 200 according to the present invention. In certain embodiments, the digital infrastructure assets include the server. Some of the programming languages that may be executed on the server include but are not limited to JavaScript (Node.js), Python, Java, PHP, Ruby, C #, Go, TypeScript, Swift, Kotlin, Perl, Scala, Rust, Elixir, F #, Dart, Haskell, Clojure, Lua, and Erlang, among others. One or more developers (i.e., a backend developer) writes server-side code using one of the programming languages. Server-side code executes on the server within a server runtime environment. The developer or a team of developers create applications and conduct tasks corresponding to data processing and storage, client request handling, database interaction, application logic implementation, API integration, security measures implementation, session management, data validation and sanitation, error handling and logging, and file management and manipulation. Each of the applications and the server may be vulnerable to one or more security risks commonly referred to herein as "vulnerability" or "vulnerabilities".

The method 700 includes an initial step 702 of conducting one or more queries with respect to the digital infrastructure assets and/or one or a team of agents 210 (i.e., developers) to establish vulnerability data utilized in the training data set. The queries may be conducted directly by the enterprise system 200 or by the third party external sources 202, 204, and may be initiated at the request of one of the agents 210, via the agent devices 212, and/or the enterprise system 200.

In some embodiments, the enterprise system 200 requests the completion of the queries when each of the digital infrastructure assets and/or the developer agents 210 is first employed by the enterprise system 200. The use of the vulnerability data related to the digital infrastructure assets and/or the developer agents 210 of the enterprise system 200 aids in establishing a benchmark for monitoring the progress of these digital infrastructure assets and/or the developer agents 210 as they continue to be used by the enterprise system 200. The use of the vulnerability data of the enterprise system 200 allows the training data set to include data regarding the past vulnerabilities of the digital infrastructure assets and/or the developer agents 210, or the interactions between each of the developer agents 210. In other embodiments, the training data set includes the vulnerability data related to an architecture and/or environment of the enterprise system 200 as well as human element vulnerability data related to one or more digital infrastructure assets. For example, the vulnerability data may include data related to the programming language or environment of the digital infrastructure assets. In another example, the vulnerability data may be human element vulnerability data related to an experience level of each of the developer agents 210, an aggregate experience level of the team of the developer agents 210, and/or a length of time one or more the developer agents 210 have been a member of the team.

A step 704 includes the collection of the training data required for performing the training of the machine learning program as described hereinabove. The collection of the training data includes the collection of the vulnerability data including the corresponding data for each digital infrastructure assets and/or the developer agents 210. As described hereinabove, such data may originate from any of the described sources 110, 200, 202, 204 and may be communicated to the computing system 206 of the enterprise system 200 using any of the methods or communication channels described hereinabove. Certain proprietary data may also be collected directly by the enterprise system 200 as a result of the monitoring of the interactions of the enterprise system 200 as described hereinabove.

A step 706 includes training the machine learning program utilizing the applicable training data to generate a predictive model having the capabilities described hereinabove. The predictive model may be acquired utilizing any of the machine learning processes described herein without necessarily departing from the scope of the present invention. In the present example, it is assumed that the training of the machine learning program at step 806 includes the use of unsupervised learning with the vulnerability data forming the training data being considered to be unlabeled, which aids in discovering counterintuitive or unexpected relationships between the vulnerability data and the digital infrastructure assets and/or the developer agents 210.

A step 708 includes predicting the vulnerabilities with respect to the digital infrastructure assets using the predictive model of the machine learning program as based on the vulnerability data at the time of the prediction. The predicting step includes the machine learning program correlating the vulnerability data to each of the digital infrastructure assets, such as the responses to queries or calculated risk scores of the digital infrastructure assets, in order to predict the vulnerabilities of the digital infrastructure assets. The predicting step results in the generation of the predicted vulnerabilities regarding the digital infrastructure asset, which may be stored to the storage device 224 of the computing system 206 as a form of the data 234.

A step 710 includes the computing system 206 of the enterprise system 200 optionally causing an action to take place in reaction to the generation of the predicted vulnerabilities with respect to the digital infrastructure assets. Such actions may relate to a communication being sent to a corresponding agent 210, a change in the digital infrastructure assets, a change in the develop agents 210, the computing system 206, and/or the enterprise system 200, and/or an implementation of security measures related to the digital infrastructure assets.

The machine learning program has been described thus far as utilizing unsupervised learning, but the machine learning program may also be configured to utilize semi-supervised learning in an attempt to create a feedback mechanism for testing the validity of the predictions made by the machine learning program with respect to a specific digital infrastructure asset, and to thereby refine the predictive model of the machine learning program. Specifically, following the above described step 708 of predicting the vulnerabilities with respect to a digital infrastructure asset, such prediction may be evaluated for accuracy by performing a step 712 of querying the enterprise system 200 regarding actual vulnerabilities of the digital infrastructure asset for which the predictions were made by the predictive model.

The querying of the enterprise system 200 may include presenting the enterprise system 200 with a request for vulnerabilities associated with one of the digital infrastructure assets mirroring that of one of the digital infrastructure assets forming the basis of the vulnerability data. For example, the predicted vulnerabilities generated with respect to the digital infrastructure asset may indicate that the digital infrastructure asset is predicted have a certain likelihood of positive results relative to system security. The querying may accordingly include the enterprise system 200 initiating a request that the enterprise system 200 determine actual results of the digital infrastructure asset related to system security. The querying step 712 may also only occur with respect to a subset of the digital infrastructure assets, as desired. The data relating to the results to such feedback queries is referred to hereinafter as the feedback data associated with the specific digital infrastructure asset. The feedback data forms a feedback data set with respect to each digital infrastructure asset that may be stored to the storage device 224 as a form of the data 234.

The previously mentioned semi-supervised learning may occur via the use of the feedback data as labeled output data with respect to the training data set. That is, the training data set may now include a combination of the vulnerability data and the feedback data associated with those related queries to evaluate the predicted vulnerabilities of the digital infrastructure assets. All such data may be unlabeled with the exception of the described feedback data. The semi-supervised training of the machine learning program via the introduction of the feedback data into the training data set is represented by step 714 in FIG. 7, which schematically illustrates the manner in which the feedback data is utilized as a part of the training data set during the training step 706. The newly trained machine learning program may include a modified predictive model, which is then able to perform the predicting step 708 in accordance with the methodology of this modified predictive model. The generation of the modified and updated predictive model is further described with reference to the description of the method of FIG. 6, which describes such a process generally. It should also be appreciated that any of the processes described in the explanation of FIG. 6 may be utilized in training and building the predictive model as described herein.

It should be appreciated that the machine learning program may operate in the absence of the semi-supervised learning as relating to steps 710, 712, and may instead rely exclusively on the predictive model generated during the unsupervised learning processes described herein without necessarily departing from the scope of the present invention.

The machine learning program has been described thus far as utilizing unsupervised or semi-supervised learning, but the machine learning program may alternatively utilize supervised learning. The supervised training process of the machine learning program may utilize any of the supervised training processes disclosed herein, including the use of a neural network having at least one hidden layer, without departing from the scope of the present invention.

A variety of different triggering conditions may be utilized by the enterprise system 200 in determining when the machine learning program should execute the predictive aspects of the machine learning program to predict the vulnerabilities with regards to a specific digital infrastructure asset. In some embodiments, the predicted vulnerabilities may be determined with respect to a specific digital infrastructure asset when such an assessment is manually requested by the agent 210 of the enterprise system 200. For example, the developer agent 210 may offer the determination of the predicted vulnerabilities of the digital infrastructure asset when the developer agent 210 believes that such an assessment may be helpful to the enterprise system 200 in assessing the likelihood of positive results related to system security of the specific digital infrastructure asset to the enterprise system 200.

In other embodiments, the predicted vulnerabilities of the specific digital infrastructure asset may be determined at fixed intervals, or otherwise on a fixed schedule. For example, the predicted vulnerabilities of the digital infrastructure asset may be determined at regular intervals, such as daily, weekly, monthly, or quarterly, or may be preprogrammed to occur on specific dates as requested by the developer agent 210, or at various phases of development of the digital infrastructure asset, as non-limiting examples.

In other embodiments, the predicted vulnerabilities may be determined when the vulnerability data profile of the specific digital infrastructure asset, as available for use in training the machine learning program and executing any predictive capabilities thereof, indicates that a triggering condition has occurred that may be indicative of the need for an assessment of the digital infrastructure asset, such as the occurrence of an event shown to have a strong correlation to a change in an assessment of the digital infrastructure asset regarding the predictions relating to the vulnerabilities thereof. For example, the vulnerability data of the digital infrastructure asset reflecting that the digital infrastructure asset has reached a certain number of vulnerabilities included therein or exceeded a predefined threshold (e.g., 30% of the vulnerabilities rated as critical) may prompt the determination of the predicted vulnerabilities when such a change in number of vulnerabilities is demonstrated to correlate to a change in the predictive assessment of the digital infrastructure asset.

The triggering conditions indicated above may also be complex in nature and may include reference to multiple different variables of the vulnerability data of the digital infrastructure assets or multiple conditional relationships therebetween.

In some embodiments, the computing system 206 of the enterprise system 200 may continuously and automatically determine the predicted vulnerabilities of the digital infrastructure assets whenever the vulnerability data set (profile), which may include the data regarding the digital infrastructure asset that has been utilized in training the machine learning program, is indicated as having changed from a previous instance as monitored by the computing system 206. This allows the prediction data corresponding to any one digital infrastructure asset to always be as up to date as possible, thereby provided a semi-real time assessment of the digital infrastructure assets via the prediction data.

With renewed reference to step 710 of FIG. 7, the enterprise system 200 may utilize the predicted vulnerabilities determined with respect to the digital infrastructure assets for performing a variety of different tasks once such predicted vulnerabilities has been determined. In some circumstances, the predicted vulnerabilities are communicated or otherwise reported directly to the corresponding developer agent(s) 210 for review by the developer agent(s) 210. In other circumstances, the predicted vulnerabilities are utilized by the enterprise system 200 to make determinations regarding further interactions or changes in behavior of the enterprise system 200, such as determining one ore more security measures or service pack for the digital infrastructure asset, and whether to implement the one or more security measures and/or the service pack when the predicted vulnerabilities is greater than a predefined threshold value. The one or more security measures may comprise security patches, among various other software fixes to improve functionality, usability, and/or performance. It is understood, however, that the security measures may also include non-technical remedies such as training for the developer agent(s) 210, for example.

The computing system 206 may also be configured to record each instance of the determination of the predicted vulnerabilities with respect to each of digital infrastructure assets, wherein such past determinations are referred to hereinafter as the historical predicted vulnerabilities regarding the digital infrastructure assets. Such historical predicted vulnerabilities may be utilized in creating a triggering condition for initiating the communication of the current predicted vulnerabilities to the developer agent(s) 210. Such a triggering condition may occur when a threshold change has been determined as occurring between the historical predicted vulnerabilities and the current predicted vulnerabilities. Such a change may refer to an amount of change in the value of any of the calculated scores reaching a threshold value with respect to previous determination of the predicted vulnerabilities, whether such change in predicted vulnerabilities is positive or negative. Such a change may be determined over the course of the history of such determinations from an initial value or may be evaluated with respect to a certain time frame, such as requiring a certain change in value with respect to a certain period of time, or a certain change with respect to any one of the previous determinations made within a specified time frame.

A first iteration may show vulnerabilities of the digital infrastructure asset at a certain level or numerical count (e.g.

10% out of 100.0% or 25 count) with a decrease of 2.0% from the previous iteration of 12% following the addition of a first security measure. A second iteration may show vulnerabilities of the digital infrastructure asset at 20% with an increase of 10% following a change in members of the team of developer agents 210 (e.g., a replacement of one of the developer agents 210 with a less experienced developer agent 210). A third iteration may show vulnerabilities of the digital infrastructure asset of 5% with a decrease of 5% following an addition of a review phase of development of the digital infrastructure asset. Each of the events causing each change in the vulnerabilities of digital infrastructure assets may be displayed in conjunction with the corresponding change in score in a manner wherein the developer agents 210 can easily identify the relationship present therebetween. According to such exemplary iterations, the developer agents 210 can easily determine the architecture and/or environment of the enterprise system 200 (e.g., programming language) and/or the human elements (e.g., specific developer agents 210, specific team of developer agents 210, experience level of developer agents 210, and the like) related to the digital infrastructure assets that are positively and negatively affecting the resulting predicted vulnerabilities, and can model future digital infrastructure assets and/or teams of developer agents 210 on the basis of such information. The ability to see the trends based on past digital infrastructure assets also allows the developer agent(s) 210 to determine whether development of the digital infrastructure asset is on the right track in achieving a specific level of vulnerabilities or security.

The developer agent(s) 210 and/or the enterprise system 100 can accordingly utilize the ability to track such vulnerabilities of the digital infrastructure assets to weigh how certain architecture and/or environment of the enterprise system 200 and/or certain human elements may affect different assessments of the digital infrastructure assets. For example, the developer agent(s) 210 and/or the enterprise system 200 can use the vulnerabilities as a "priority score" and prioritize those digital infrastructure assets that have a higher level or number count of vulnerabilities and are shown to require more enterprise system 200 resources rather than the digital infrastructure assets that have a lower level or number count of vulnerabilities to improve a security of the enterprise system 200 and/or a network data flow, or can attempt to implement those security measures or service packs having a positive impact on the largest number of vulnerabilities of system security and/or network data flow, as the circumstances may warrant.

The disclosed methods ensure that the most secure digital infrastructure assets are implemented by the enterprise system 200 such that the security and network data flow of the enterprise system 200 is improved. The improved system security may also facilitate an improvement in the relationship between the enterprise system 200 and the user 110 via the enhanced protection of the personal data of the user 110.

The use of the machine learning program and resulting predictive model also improves the efficiency of the operation of the computing system 206 in various different respects. First, the disclosed method provides an ability for the computing system 206 to eliminate unnecessary calculations and communications relating to certain tasks performed by the computing system 206 that have been found to not have a positive improvement on the system security. For example, the disclosed method provides a means for the computing system 206 to determine whether certain digital infrastructure assets increase positive results related to system security and to what effect and may then prioritize and direct more resources (e.g., developer agent(s) 210) to those digital infrastructure assets that have a high level or number count of vulnerabilities in accordance with the predictions made by the predictive model. The computing system 206 may be configured to automatically implement certain security measures and/or service packs via the review of such predicted vulnerabilities. This results in the computing system 206 avoiding a waste of resources when performing certain tasks, such as sending unnecessary communications related to the digital infrastructure assets to various agents 210, via the agent devices 212, that will never interact with or benefit from the sending of such communications.

The use of the machine learning program also allows for certain variables in the vulnerability data sets utilized in the training process to be determined to be irrelevant to certain relationships. The identification of these variables that do not contribute to any specific result may be omitted from further analysis or may no longer be monitored by the computing system 206 in forming the vulnerability data sets. The predictive model accordingly provides a means to identify the data that is not necessary to be tracked or collected and further allows for the calculations occurring via the computing system 206 to be simplified by means of the elimination of additional variables.

Each of the described advantages improves system security and reduces network data flow (i.e., traffic) as experienced by the computing system 206 due to the ability to manage the development of the digital infrastructure assets.

Operations of the methods, and combinations of operation in the methods, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the method.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

From the foregoing description, one ordinarily skilled in the art can easily ascertain the essential characteristics of this invention and, without departing from the spirit and scope thereof, can make various changes and modifications to the invention to adapt it to various usages and conditions.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein. Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A method of improving system security, comprising:

providing a computing system with at least one processing device and at least one memory device, wherein the computing system executes computer-readable instructions;

providing a network connection operatively connecting the at least one processing device and the at least one memory device of the computing system, the network connection configured to permit network data flow between the at least one processing device and the at least one memory device of the computing system;

receiving, via the computing system, vulnerability data for one or more digital infrastructure assets, wherein the vulnerability data includes human element vulnerability data related to at least one of: (i) an experience level of each of one or more developers of the one or more digital infrastructure assets, (ii) an aggregate experience level of a team of developers of the one or more digital infrastructure assets, or (iii) a length of time one or more of the developers have been a member of the team;

generating, via the computing system, a vulnerability data set based upon the vulnerability data for the one or more digital infrastructure assets;

generating, via the computing system, a predictive model based on the vulnerability data set;

initiating, via the computing system, a machine learning program as the predictive model;

applying, via the computing system, the vulnerability data set to the predictive model;

predicting, via the computing system, vulnerabilities of the one or more digital infrastructure assets based upon the vulnerability data set;

determining, via the computing system, at least one security measure for the one or more digital infrastructure assets based on the predictive model;

implementing, via the computing system, the at least one security measure for the one or more digital infrastructure assets based on the predictive model;

tracking, via the computing system, historical predicted vulnerabilities with respect to each of the one or more digital infrastructure assets, wherein a threshold change between the historical predicted vulnerabilities and a current predicted vulnerability triggers communication of the current predicted vulnerability to one or more of the developers;

querying, via the computing system, the one or more digital infrastructure assets regarding actual vulnerabilities following implementation of the at least one security measure to obtain feedback data;

comparing, via the computing system, the current predicted vulnerability against the actual vulnerabilities indicated by the feedback data to evaluate accuracy of the predictive model; and updating, via the computing system, the predictive model based on the comparison to refine subsequent predictions of vulnerabilities for the one or more digital infrastructure assets.

2. The method of claim 1, wherein the vulnerability data set includes historical vulnerability data for the one or more digital infrastructure assets.

3. The method of claim 1, wherein the one or more digital infrastructure assets comprises one or more servers.

4. The method of claim 1, wherein the vulnerability data includes a programming language of the one or more servers.

5. The method of claim 1, wherein the at least one security measure is training for one or more of the developers of the one or more digital infrastructure assets.

6. The method of claim 1, further comprising prioritizing an implementation of the at least one security measure based on the predictive model.

7. A system for improving system security, comprising:

a computing system with at least one processing device and at least one memory device, wherein the computing system executes computer-readable instructions; and a network connection operatively connecting the at least one processing device and the at least one memory device of the computing system, the network connection configured to permit network data flow between the at least one processing device and the at least one memory device of the computing system;

wherein, upon execution of the computer-readable instructions, the computing system is configured to:

receive, via the computing system, vulnerability data for one or more digital infrastructure assets, wherein the vulnerability data includes human element vulnerability data related to at least one of: (i) an experience level of each of one or more developers of the one or more digital infrastructure assets, (ii) an aggregate experience level of a team of developers of the one or more digital infrastructure assets, or (iii) a length of time one or more of the developers have been a member of the team;

generate, via the computing system, a vulnerability data set based upon the vulnerability data for the one or more digital infrastructure assets;

generate, via the computing system, a predictive model based on the vulnerability data set;

initiate a machine learning program as the predictive model;

apply the vulnerability data set to the predictive model;

predict vulnerabilities of the digital infrastructure assets based upon the vulnerability data set:

determine, via the computing system, at least one security measure for the one or more digital infrastructure assets based on the predictive model;

implement, via the computing system, the at least one security measure for the one or more digital infrastructure assets based on the predictive model;

track, via the computing system, historical predicted vulnerabilities with respect to each of the one or more digital infrastructure assets, wherein a threshold change between the historical predicted vulnerabilities and a current predicted vulnerability triggers communication of the current predicted vulnerability to one or more of the developers;

query the one or more digital infrastructure assets regarding actual vulnerabilities following implementation of the at least one security measure to obtain feedback data;

compare the current predicted vulnerability against the actual vulnerabilities indicated by the feedback data to evaluate accuracy of the predictive model; and update the predictive model based on the comparison to refine subsequent predictions of vulnerabilities for the one or more digital infrastructure assets.

8. The system of claim 7, wherein the vulnerability data set includes historical vulnerability data for the one or more digital infrastructure assets.

9. The system of claim 7, wherein the one or more digital infrastructure assets comprises one or more servers.

10. The system of claim 9, wherein the vulnerability data includes a programming language of the one or more servers.

11. The system of claim 7, wherein the at least one security measure is training for one or more of the developers of the one or more digital infrastructure assets.

12. The system of claim 7, wherein, upon execution of the computer-readable instructions, the computing system is further configured to prioritize an implementation of the at least one security measure based on the predictive model.

* * * * *